US008271041B2

(12) United States Patent
Tanigawa et al.

(10) Patent No.: US 8,271,041 B2
(45) Date of Patent: Sep. 18, 2012

(54) RADIO BASE STATION, RADIO COMMUNICATION CONTROL SYSTEM, AND RADIO COMMUNICATION CONTROL METHOD

(75) Inventors: Daisuke Tanigawa, Kawasaki (JP); Hidehiko Oyane, Yokohama (JP); Akihito Hanaki, Yokohama (JP); Tatsuro Yajima, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 619 days.

(21) Appl. No.: 12/349,866

(22) Filed: Jan. 7, 2009

(65) Prior Publication Data

US 2009/0181677 A1 Jul. 16, 2009

(30) Foreign Application Priority Data

Jan. 10, 2008 (JP) ................................ P2008-003445

(51) Int. Cl.
*H04M 1/00* (2006.01)

(52) U.S. Cl. ............... 455/561; 455/550.1; 455/552.1; 455/560; 455/436; 455/438; 370/331

(58) Field of Classification Search .......... 455/436–444, 455/550.1, 552.1, 561, 560; 370/331
See application file for complete search history.

(56) References Cited

U.S. PATENT DOCUMENTS

| | | | |
|---|---|---|---|
| 5,697,054 A * | 12/1997 | Andersson | 455/524 |
| 6,907,237 B1 | 6/2005 | Dorenbosch et al. | |
| 7,143,092 B1 * | 11/2006 | Gregorat | 1/1 |
| 7,729,346 B2 * | 6/2010 | Lee et al. | 370/389 |
| 7,937,110 B2 * | 5/2011 | Wu et al. | 455/561 |
| 2007/0021140 A1 * | 1/2007 | Keyes et al. | 455/522 |
| 2008/0261641 A1 * | 10/2008 | Tang et al. | 455/517 |
| 2009/0124259 A1 * | 5/2009 | Attar et al. | 455/436 |

FOREIGN PATENT DOCUMENTS

| | | |
|---|---|---|
| JP | 2005-260516 A | 9/2005 |
| JP | 2006-268204 A | 10/2006 |
| WO | 2004/098104 A1 | 11/2004 |

OTHER PUBLICATIONS

Extended European Search Report issued on Aug. 22, 2011 in the counterpart European patent application.

* cited by examiner

*Primary Examiner* — Junpeng Chen
(74) *Attorney, Agent, or Firm* — Marvin A. Motsenbocker; Mots Law, PLLC

(57) ABSTRACT

The radio base station includes a monitoring controller for determining whether to switch between BB cards; and a baseband signal processor for transmitting a suspension request to suspend the transmission of the user data when it is determined that the BB cards are switched, and performing the handover of a processing between the BB cards based on the transmission of the suspension request. The baseband signal processor transmits a capacity allocation or a zero grant requesting to set the transmission rate of the user data to zero.

6 Claims, 6 Drawing Sheets

RADIO BASE STATION, RADIO COMMUNICATION CONTROL SYSTEM, AND RADIO COMMUNICATION CONTROL METHOD

BACKGROUND OF THE INVENTION

1. Field of the Invention

The present invention relates to a radio base station having a first baseband processor performing a processing of a baseband signal including user data transmitted and received by a mobile station, and having a second baseband processor used as a standby system of the first baseband processor. The present invention also relates to a radio communication control system and a radio communication control method.

2. Description of the Related Art

The radio base station transmitting and receiving a radio signal to and from a mobile station includes a baseband processor performing various processing (e.g., the allocating of a communication channel to a mobile station) in a baseband.

Such a radio base station is usually provided with a plurality of baseband processors (BB cards) in preparation for a processor fault and maintenance work for a baseband processor. Specifically, such a radio base station employs a redundant configuration using a baseband processor of an active system and that of a standby system (e.g., refer to Japanese Patent Application Publication No. 2006-268204 (page 4, FIG. 2)).

For example, when a fault occurs in a baseband processor of an active system, various parameters (e.g., information of allocated communication channels) associated with communication which is being made via the baseband processor of a active system are handed over to a baseband processor of a standby system from the baseband processor of an active system. Upon completion of the handover of the parameters, a processing which has been performed by the baseband processor of an active system is switched to a processing performed by the baseband processor of a standby system.

The transfer of user data transmitted and received by a mobile station is suspended until the switching from the baseband processor of an active system to that of a standby system is complete. Therefore, after the switching to the baseband processor of a standby system is complete, user data lost without being property transferred due to the suspension above are retransmitted by an upper layer.

Meanwhile, in recent years, radio communication schemes having a transmission rate increased to a large degree in a radio section have been developed. For example, the high speed downlink packet access (HSDPA) and an enhanced uplink (EUL) have been defined by the 3rd generation partnership project (3GPP).

In such a radio communication scheme having a transmission rate increased to a large degree within a radio section, an amount of user data transmitted in a short period of time is also increased. Accordingly, there is a problem that when the switching to the above-described baseband processor of a standby system is performed, an amount of missing user data is increased. Moreover, the increased amount of missing data possibly causes the case where data retransmission by the upper layer does not sufficiently recover the missing data.

Therefore, the present invention has been made in light of the above problems, and an object thereof is to provide a radio base station, a radio communication control system, and a radio communication control method, in which the radio base station capable of preventing loss of user data, even when a baseband processor is switched to another one in a radio communication scheme having a transmission rate increased to a large degree in a radio section.

SUMMARY OF THE INVENTION

A first aspect of the present invention is summarized as a radio base station (radio base station 200) includes a first baseband processor (BB card 221) configured to perform a processing of a baseband signal (baseband signal BS) including user data (user data UD) transmitted and received by a mobile station (mobile station 300); a second baseband processor (BB card 223) used as a standby system of the first baseband processor (BB card 221); a switching determiner (monitor & controller 230) configured to determine whether or not to switch from the first baseband processor to the second baseband processor; an information transmitter (baseband signal processor 220) configured to transmit a suspension request (e.g., a notification indicative of CA rate=0 kbps) to suspend the transmission of the user data when the switching determiner determines the switching from the first baseband processor to the second baseband processor; and an handover execution unit (baseband signal processor 220) configured to perform the handover of a processing from the first baseband processor to the second baseband processor, based on the transmission of the suspension request by the information transmitter, or on the determination of the transmission of the suspension request, in which the information transmitter transmits the suspension request to set the transmission rate of the user data to zero.

According to this radio base station, before switching from the first baseband processor to the second baseband processor, the suspension request to set the transmission rate of the user data to zero is transmitted to the mobile station (or a communication network controller).

Thus, even when a baseband processor is switched to another one, the radio base station is capable of preventing the user data UD from being lost using a control function for the transmission rate of the user data UD.

A second aspect of the present invention is summarized as the base station according to the first aspect of the present invention, wherein when the handover execution unit completes the handover of the processing from the first baseband processor to the second baseband processor, the information transmitter transmits a communication resuming request (e.g., a notification indicative of CA rater=x kbps) to increase the transmission rate.

A third aspect of the present invention is summarized as the base station according to the second aspect of the present invention, wherein the information transmitter transmits the communication resuming request indicating that the transmission rate to increase the transmission rate to a settable lowest transmission rate (a floor grant).

A fourth aspect of the present invention is summarized as the base station according to the first aspect of the present invention, wherein the handover execution unit: performs an handover processing (resource drive-out) in which a parameter of the user data set in the first baseband processor is handed over to the second baseband processor; retains the user data in the first baseband processor when receiving the user data before completion of the handover processing; and retains the user data in the second baseband processor when receiving the user data after completion of the handover processing.

A fifth aspect of the present invention is summarized as the base station according to the first aspect of the present invention, wherein the first baseband processor relays the user data corresponding to each one of a plurality of mobile stations, the handover execution unit performs an handover processing (resource drive-out) in which a parameter of the user data set in the first baseband processor is handed over to the second baseband processor, and based on an amount of the user data received by the first baseband processor within a predetermined period of time, the handover execution unit starts performing the handover processing for the mobile stations in descending order of the amount of the user data.

A sixth aspect of the present invention is summarized as the base station according to the first aspect of the present invention, wherein the radio base station operates in accordance with HSDPA defined by the 3rd generation partnership project, and the information transmitter transmits a notification indicating that a capacity allocation rate is 0 kbps, to a radio network controller (a radio network controller 100), as the suspension request.

A seventh aspect of the present invention is summarized as the base station according to the first aspect of the present invention, wherein the radio base station operates in accordance with EUL defined by the 3rd generation partnership project; and the information transmitter transmits a zero grant to the mobile station as the suspension request.

An eighth aspect of the present invention is summarized in that a radio communication control system (radio base station 200) includes a first baseband processor configured to perform a processing of a baseband signal including user data transmitted and received by a mobile station, a second baseband processor used as a standby system of the first baseband processor; a switching determiner configured to determine whether or not to switch from the first baseband processor to the second baseband processor; an information transmitter configured to transmit a suspension request to suspend the transmission of the user data when the switching determiner determines the switching from the first baseband processor to the second baseband processor; and an handover execution unit configured to perform the handover of a processing from the first baseband processor to the second baseband processor, based on the transmission of the suspension request by the information transmitter, or on the determination of the transmission of the suspension request, in which the information transmitter transmits the suspension request to set the transmission rate of the user data to zero.

A ninth aspect of the present invention is summarized in that a radio communication control method uses a radio base station having a first baseband processor performing a processing of a baseband signal including user data transmitted and received by a mobile station, and a second baseband processor used as a standby system of the first baseband processor, the radio communication control method comprising the steps of: determining whether or not to switch from the first baseband processor to the second baseband processor; transmitting a suspension request to suspend the transmission of the user data when the switching determiner determines the switching from the first baseband processor to the second baseband processor; and performing the handover of a processing from the first baseband processor to the second baseband processor, based on the transmission of the suspension request by the information transmitter, or on the determination of the transmission of the suspension request, in which the suspension request to set the transmission rate of the user data to zero is transmitted in the transmitting step.

In accordance with the present invention, it is possible to provide a radio base station, a radio communication control system, and a radio communication control method, in which the radio base station capable of preventing loss of user data even when a baseband processor is switched to another one in a radio communication scheme having a transmission rate increased to a large degree in a radio section.

DETAILED DESCRIPTION OF THE PREFERRED EMBODIMENTS

Next, an embodiment of the present invention is described. More specifically, described are (1) Schematic Configuration of Entire Radio Communication System, (2) Functional Block Configuration of Radio Base Station, (3) Operation of Radio Base Station, (4) Advantageous Effects, and (5) Other Embodiments.

In the following description of the drawings, the same or similar parts will be denoted by the same or similar reference numerals. However, it should be noted that the drawings are schematic and ratios of dimensions and the like are different from actual ones.

Therefore, specific dimensions and the like should be determined by taking into consideration the following description. Moreover, as a matter of course, also among the drawings, there are included portions in which dimensional relationships and ratios are different from each other.

(1) SCHEMATIC CONFIGURATION OF ENTIRE RADIO COMMUNICATION SYSTEM

Figure 1:
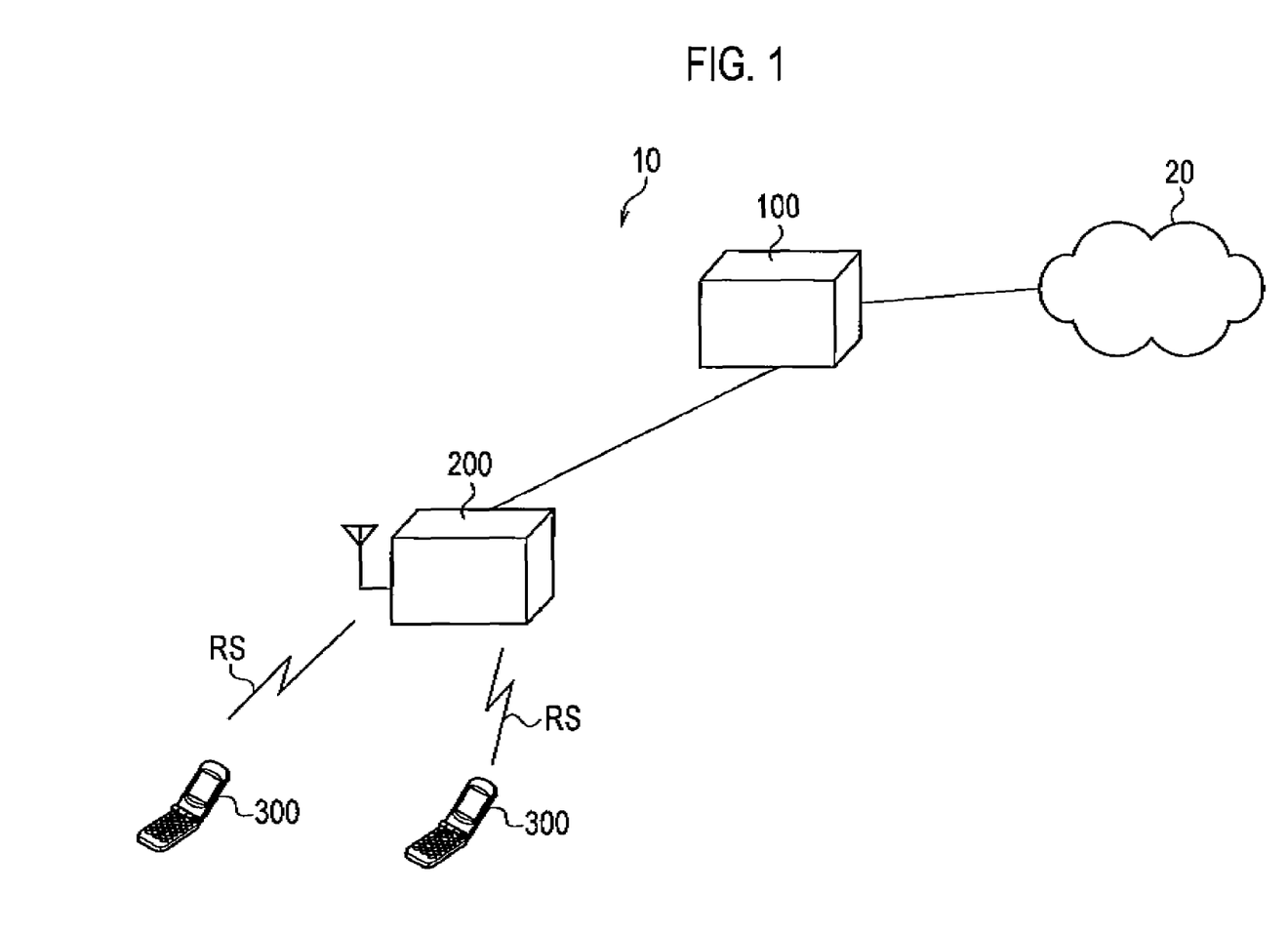
FIG. 1 is a diagram showing a schematic configuration of an entire radio communication system 10 according to an embodiment of the present invention.

FIG. 1 is a diagram showing a schematic configuration of an entire radio communication system 10 of this embodiment. As shown in FIG. 1, the radio communication system 10 includes a radio network controller 100 (hereinafter, referred to as "RNC 100"), a radio base station 200, and a mobile station 300. Incidentally, the number of the radio base stations 200, and that of the mobile stations 300 are each not limited to that shown in FIG. 1.

The RNC 100 is connected to a communication network 20. To the communication network 20, a communication apparatus, for example a streaming server (not shown), performing communication with the mobile station 300 is connected.

The radio communication system 10 employs a radio communication scheme defined by the 3rd generation partnership project (3GPP), i.e., a W-CDMA scheme. Further, in the radio communication system 10, high speed downlink packet access (HSDPA) is introduced and transmission rate of downlink data is increased. In addition, in the radio communication system 10, an enhanced uplink (EUL) is also introduced and the transmission rate of uplink data is increased. That is, the RNC 100, the radio base station 200, and the mobile station 300 operate according to HSDPA and EUL.

The radio base station 200 transmits and receives radio signal RS to and from the mobile station 300. Further, the radio base station 200 is connected to the RNC 100. Based on an instruction given by the RNC 100, the radio base station 200 controls various parameters of a radio signal RS and a baseband signal BS (refer to FIG. 2, not shown in FIG. 1) which are transmitted to or received from the mobile station 300.

(2) FUNCTIONAL BLOCK CONFIGURATION OF RADIO BASE STATION

Figure 2:
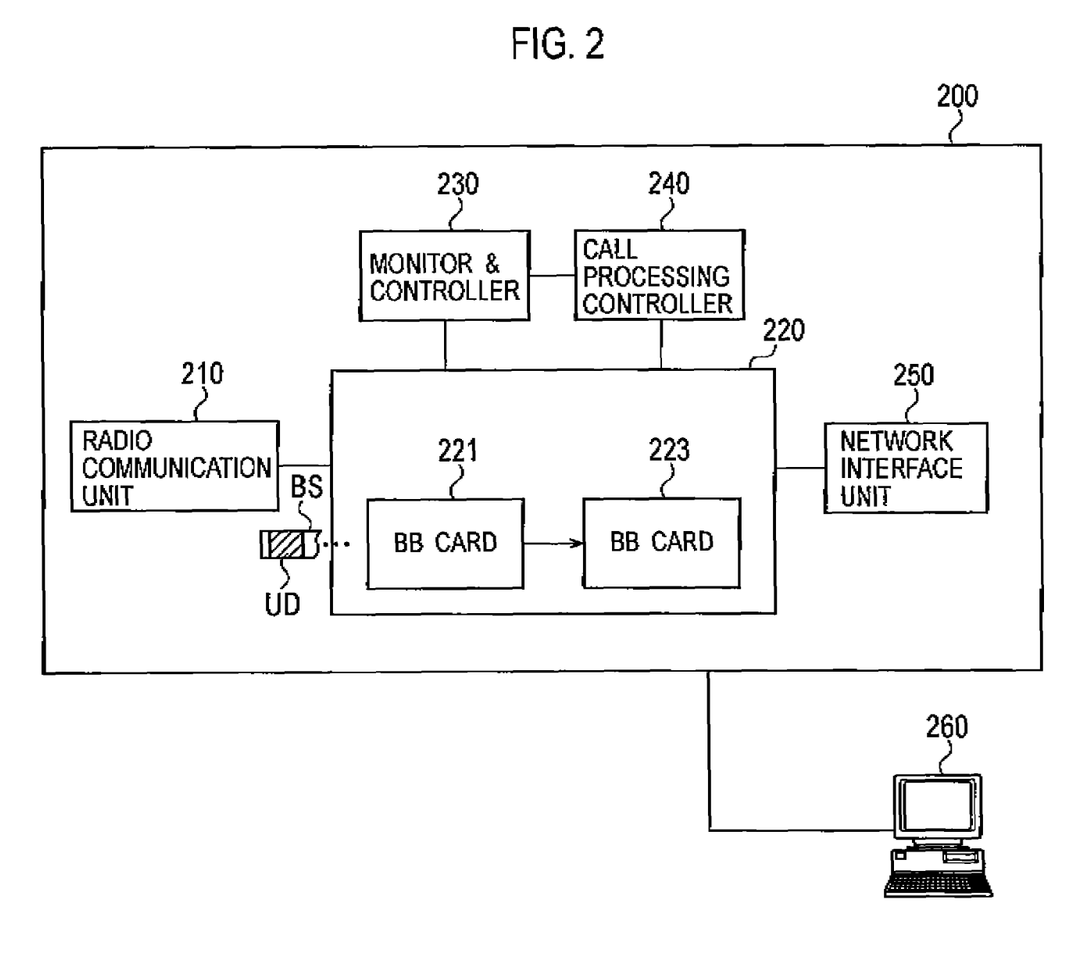
FIG. 2 is a functional block diagram of a radio base station 200 according to an embodiment of the present invention.

FIG. 2 is a functional block diagram of the radio base station 200. As shown in FIG. 2, the radio base station 200 includes a radio communication unit 210, a baseband signal processor 220, a monitor & controller 230, a call processing controller 240, and a network interface unit 250. Further, an operation system 260 is connected to the radio base station 200.

The radio communication unit 210 transmits and receives the radio signal RS to and from the mobile station 300. The radio communication unit 210 performs a conversion between the radio signal RS and the baseband signal BS.

The baseband signal processor 220 includes a plurality of baseband processors representing, i.e., a BS card 221 and a BB card 223.

The BB card 221 is a baseband processor of an active system performing a processing of the baseband signal BS. That is, the processing of the baseband signal BS is normally performed using the BB card 221. The baseband signal BS includes user data UD and various types of control data (not shown) which are transmitted to or received from the mobile station 300. In this embodiment, the BB card 221 configures a first baseband processor.

The BB card 223 is a baseband processor of a standby system. Specifically, the BB card 223 is used as a standby system for the BE card 221. That is, when a fault occurs in the BB card 221, or when maintenance work is carried out for the BB card 221, a processing on the baseband signal BS is performed using the BB card 223 instead of the BE card 221. In this embodiment, the BB card 223 configures a second baseband processor.

When switching from the BB card 221 to the BE card 223 is determined by the monitor & controller 230, the baseband signal processor 220 transmits a suspension request for suspending the transmission of the user data UD, to the RNC 100 and the mobile station 300. In this embodiment, the baseband signal processor 220 configures an information transmitter.

More specifically, the baseband signal processor 220 transmits, to the RNC 100, a notification indicating that the rate of Capacity Allocation (hereinafter, referred to as CA rate) is 0 kbps. With this notification, the baseband signal processor 220 causes the RNC 100 to suspend the transmission of the user data UD, i.e., the transmission of downlink user data UD.

In addition, the baseband signal processor 220 transmits a notification to the mobile station 300 using a zero grant, the notification indicating that the transmission rate of transmittable user data UD is 0 kbps. With this notification, the baseband signal processor 220 causes the mobile station 300 to suspend the transmission of the user data UD, i.e., the transmission of uplink user data UD.

In this manner, the baseband signal processor 220 transmits a suspension request (CA rate=0 kbps, zero grant) indicating that the transmission rate of the user data UD is made zero.

Further, when switching from the BB card 221 of the active system to the BB card 223 of the standby system, i.e., the handover of the processing is complete, the baseband signal processor 220 transmits a communication resuming request indicating that the transmission rate of the user data UD is increased, to the RNC 100 or to the mobile station 300.

Specifically, the baseband signal processor 220 transmits, to the RNC 100, a notification indicating that the CA rate is other than 0 kbps, e.g., x kbps. The baseband signal processor 220 transmits, to the mobile station 300, a floor grant, i.e., a notification indicating that the transmission rate of the user data UD is increased to a settable lowest transmission rate.

Based on the transmission of the above suspension request (CA rate=0 kbps, the zero grant) or on a decision made to transmit the suspension request, the baseband signal processor 220 performs the handover of the processing from the BB card 221 of the active system to the BB card 223 of the standby system. In this embodiment, the baseband signal processor 220 configures a handover execution unit.

The baseband signal processor 220 performs a handover processing in which a parameter of the user data UD set on the BB card 221 is handed over to the BB card 223. Incidentally, in this embodiment, this handover processing is expressed as "resource drive-out" from the BE card 221 to the BB card 223.

When receiving the user data UD before completing the resource drive-out, the baseband signal processor 220 retains the user data UD in the BB card 221 of the active system. Meanwhile, when receiving the user data UD after completing the resource drive-out, the baseband signal processor 220 retains the user data UD in the BB card 223.

Based on an amount of the user data UD received by the BB card 221, the baseband signal processor 220 starts the resource drive-out from the mobile station 300 having a large amount of the user data UD.

The monitor & controller 230 monitors and controls each functional block included in the radio base station 200. Particularly, in this embodiment, the monitor & controller 230 determines whether or not to switch from the BB card 221 of the active system to the BB card 223 of the standby system. In this embodiment, the monitor & controller 230 configures a switching determiner.

Specifically, the monitor & controller 230 monitors whether or not a fault has occurred in the BB card 221. When determining that a fault has occurred in the BB card 221, the monitor & controller 230 causes the baseband signal processor 220 to switch to the BB card 223 of the standby system.

The monitor & controller 230 determines that the switching to the BB card 223 of the standby system is performed based on an instruction given by the operation system 260. For example, when carrying out maintenance work for the BB card 221, an operator operates the operation system 260 to instruct the switching from the active system to the standby system. The operation system 260 outputs a command for instructing the switching, to the monitor & controller 230.

The call processing controller 240 performs a control on a call processing set through the baseband signal processor 220. Specifically, the call processing controller 240 performs a newly generated call (a new call) setting processing, i.e., the setting of a communication channel, or a terminated call release process.

The network interface unit 250 provides a network interface for performing communication with the RNC 100. Specifically, the network interface unit 250 includes a wired LAN interface and the like.

The operation system 260 is connected to the main body of the radio base station 200. The operation system 260 displays the state of a functional block included in the radio base station 200, or outputs a command to a specific functional block.

(3) OPERATION OF RADIO BASE STATION

Next, operation of the radio communication system 10 is described. Specifically, described is control operation of the user data UD in the case where switching from a baseband processor (BB card 221) of an active system to a baseband processor (BB card 223) of a standby system is performed in the radio base station 200.

(3.1) CONTROL OPERATION OF DOWNLINK USER DATA UD

Figure 3:
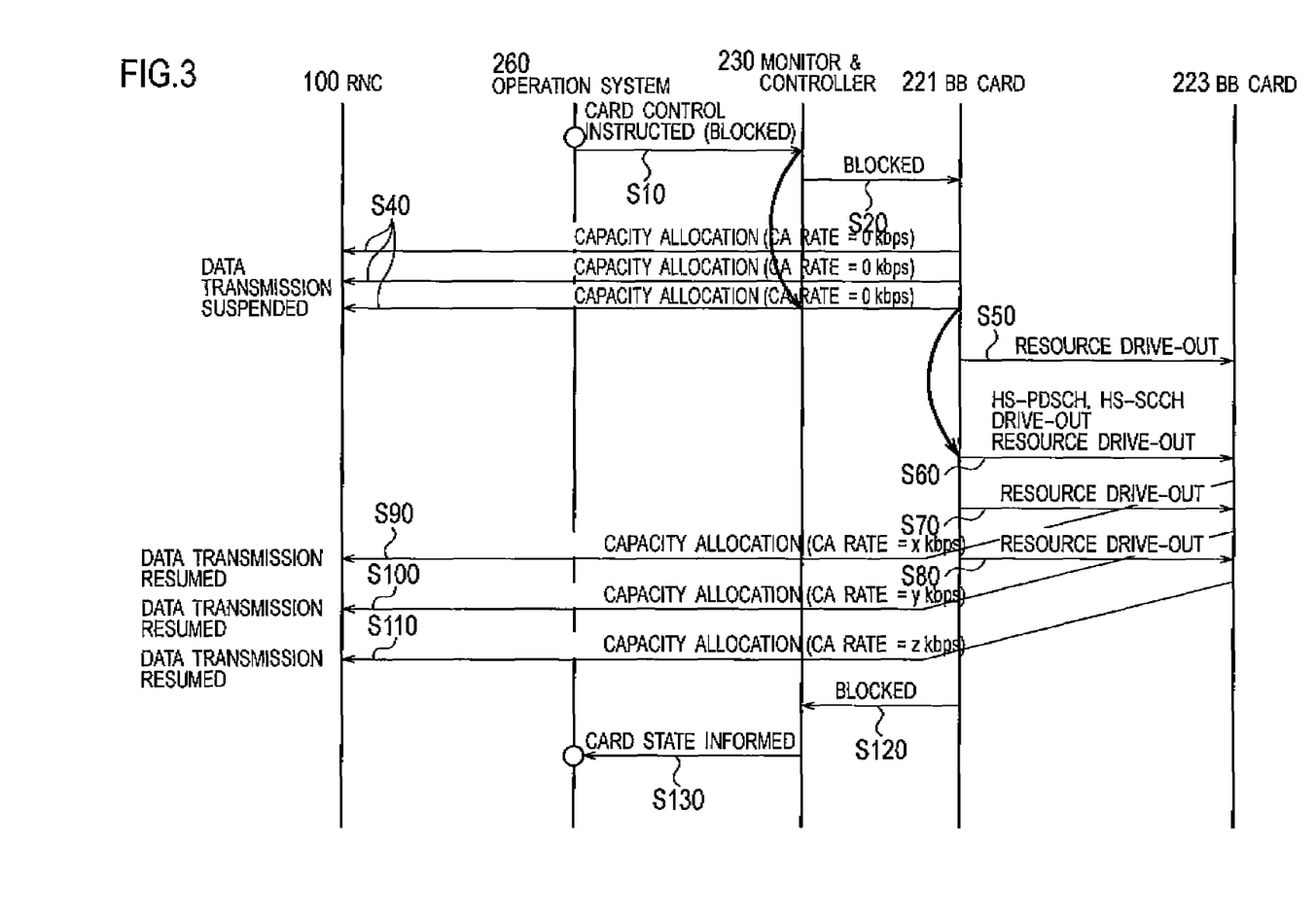
FIG. 3 is a communication sequence diagram on the control of downlink user data UD in the case where switching to a baseband processor of a standby system according to an embodiment of the present invention is performed.

FIG. 3 is a communication sequence diagram on the control of the downlink user data UD in the case where switching to the baseband signal processor of the standby system is performed. As described above, in this embodiment, the high speed downlink packet access (HSDPA) in which the transmission rate of downlink data is increased is introduced.

As shown in FIG. 3, in Step S10, the operation system 260 transmits a card control instruction to the monitor & controller 230. More specifically, based on an operation by the operator, the operation system 260 instructs switching from the BB card 221 of the active system to the BB card 223 of the standby system.

In Step S20, based on the switching instruction from the operation system 260, the monitor & controller 230 instructs the BB card 221 to perform a blocking processing, i.e., the resource drive-out on the user data UD from the BB card 221 to the BB card 223.

In Step S40, the BE card 221 transmits, to the RNC 100, a suspension request for suspending the transmission of the user data UD, i.e., a notification indicating that the CA rate is 0 kbps. Incidentally, in Step S40, at timing immediately before a predetermined period of time set in y msec is expired, suspension requests (CA rate=0 kbps) corresponding to a plurality of HSDPA users are transmitted altogether. Suspension requests corresponding to all the HSDPA users are transmitted within y msec.

Receiving the suspension request from the radio base station 200, the RNC 100 suspends transmission of a frame protocol (FP) of a high speed downlink shared channel (HS-DSCH).

In Steps S50 to S80, the BB card 221 performs the handover processing, the so-called resource drive-out, in which parameters of the user data UD set in the BB card 221 are handed over to the BB card 223.

More specifically, the call processing controller 240 newly sets parameters of the user data UD in the BB card 223 for each HSDPA user, the parameters being set in units of cells (sectors/carriers) and being transmitted and received by the HSDPA users (mobile stations 300). By performing the resource drive-out from the BB card 221 to the BB card 223, the BB card 223 can resume the relay of the user data UD.

Incidentally, in Step S60, the BB card 221 performs the handover (resource drive-out) of the parameters regarding a high speed physical downlink shared channel (HS-PDSCH) and a shared control channel for HS-DSCH (HS-SCCH). Specifically, various parameters are updated in the BB card 223 sequentially for the HSDPA users in the order of completion of the resource drive-out.

Of the HSDPA users targeted for the resource drive-out, an HSDPA user set to a high priority class has priority over an HSDPA user set to a low priority class. Further, when there are a plurality of HSDPA users set to the same priority class, one with a large amount of the user data UD relayed in the BB card 221 has priority over the others.

Until x msec elapses from the processing in Step S40, the BB card 221 continues the transmission of the user data UD received from the communication network 20. Incidentally, x msec is set depending on a capacity of a buffer (not shown) retaining the user data UD.

In Steps S90 to S110, based on completion of the switching from the BB card 221 of the active system to the BB card 223 of the standby system, the BB card 223 transmits, to the RNC 100, a communication resuming request indicating that the transmission rate of the user data UD is increased, i.e., a notification indicating that the CA rate is x kbps (y kbps, z kbps).

In Step S120, the BB card 221 informs the monitor & controller 230 of completion of the blocking processing.

In Step S130, the monitor & controller 230 informs the operation system 260 of the state of the BB card 221.

Meanwhile, when a new call is set while performing the resource drive-out, a necessary processing is performed in the BB card 223 on the handed-over side. Further, when a Cell Change setting is performed by another cell while performing the resource drive-out, a Cell Change setting is performed in the BB card 223 on the handed-over side.

Further, although the operation system 260 issues an instruction to switch from the BB card 221 of the active system to the BB card 223 of the standby system in the above communication sequencer the monitor & controller 230 may detect an occurrence of a fault, and perform the processing in Step S20 when the fault occurs in the BB card 221.

(3.2) CONTROL OPERATION OF UPLINK USER DATA UD

Figure 4:
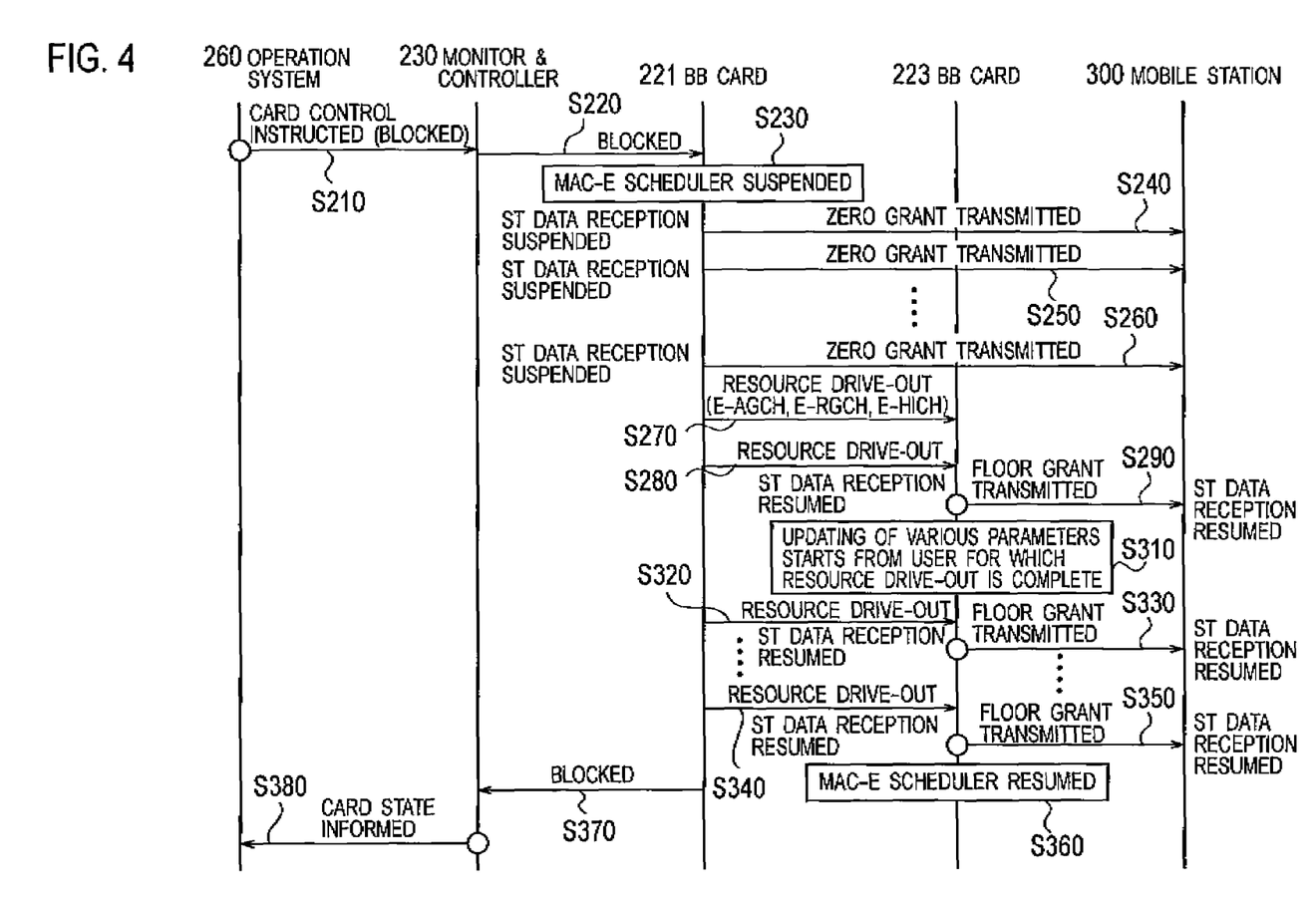
FIG. 4 is a communication sequence diagram (Operation 1) on the control of uplink user data UD in the case where switching to a baseband processor of a standby system according to an embodiment of the present invention is performed.
Figure 5:
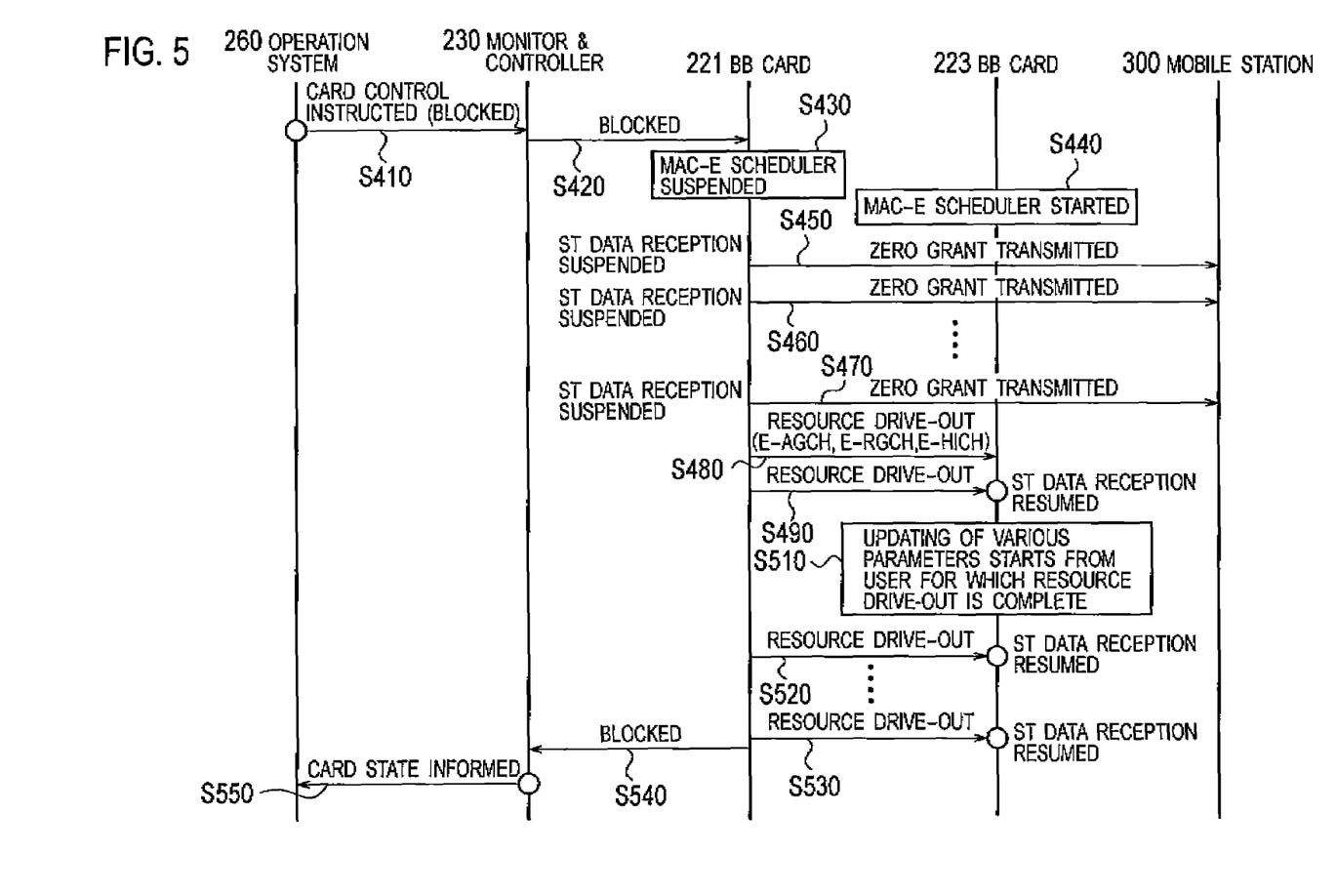
FIG. 5 is a communication sequence diagram (Operation 2) on the control of uplink user data UD in the case where switching to a baseband processor of a standby system according to an embodiment of the present invention is performed.

FIGS. 4 and 5 each are a communication sequence diagram on the control of the uplink user data UD in the case where switching to a baseband signal processor of a standby system is performed. As described above, in this embodiment, an enhanced uplink (EUL) is introduced in which transmission rate of uplink data is increased.

In the following description, parts different from the above-described communication sequence on the control of the downlink user data UD are mainly described, and a further description of similar parts is appropriately omitted.

(3.2.1) OPERATION OF EXAMPLE 1

As shown in FIG. 4, in Step S210, the operation system 260 transmits, to the monitor & controller 230, a card control instruction, i.e., an instruction on switching from the BB card 221 of the active system to the BB card 223 of the standby system.

In Step S220, the monitor & controller 230 instructs the BB card 221 to perform the blocking processing.

In Step S230, the BB card 221 stops a MAC-e scheduler. That is, the BB card 221 stops controls of baseband resources such as the control of transmission rate and the control of transmission timing of the user data UD.

In Steps S240 to S260, the BB card 221 transmits, to the mobile station 300, the zero grant, i.e., a notification (a suspension request) indicating that the transmission rate of transmittable user data UD is 0 kbps. In addition, in Steps S240 to S260, the zero grants corresponding to a plurality of EUL users are transmitted.

With the zero grant transmitted from the radio base station 200 to the mobile station 300, the mobile station 300 suspends use of allocated resources, i.e., suspends the transmission of the user data UD. Incidentally, a scope of an absolute grant (the absolute value of a maximum allowed E-DPDCH/DPCCH power ratio assigned to the mobile station 300) at the time of transmission of the zero grant is as follows.

In the case where TTI=2 ms: for each H-ARQ process
In the case where TTI=10 ms: all H-ARQ processes
Further, the scope of the absolute grant may be all H-ARQ processing without depending on the value of TTI.

In Steps S270 to S280, the BB card 221 performs an handover processing, i.e., the resource drive-out, in which parameters of the user data UD set in the BB card 221 are handed over to the BB card 223. That is, in Step S270, the BB card 221 performs the handover processing (resource drive-out) on parameters regarding an E-DCH absolute grant channel (E-AGCH), an E-DCH relative grant channel (E-RGCH), and an E-DCH hybrid ARG indicator channel (E-HICH).

In Step S290, based on completion of the switching from the BB card 221 of the active system to the BB card 223 of the standby system, the BB card 223 transmits the communication resuming request indicating that the transmission rate of the user data UD is increased, i.e., the floor grant, to the mobile station 300. Once the floor grant is transmitted to the mobile station 300, the BB card 223 and the mobile station 300 resume reception of the user data UD (Scheduled Transmission (ST) data).

At the timing of performing the resource drive-out from the BB card 221 to the BB card 223, a processing on NST data (Non-Scheduled Transmission) performed by the BB card 221 is switched to a processing performed by the BB card 223. In addition, the BB card 223 undertakes, from the BB card 221, information on whether a process is active or inactive for each process ID, and targeting only the active process, the floor grant is transmitted.

In Step S310, the BB card 223 updates various parameters sequentially for EUL users in the order of completion of the resource drive-out.

In Steps S320 to S350, the transmission of the resource drive-out and the floor grant is repeated for each EUL user.

In Step S360, the BB card 223 resumes the MAC-e scheduler. That is, the BB card 223 resumes the control of the transmission rate and the control of transmission timing of the user data UD.

In Step S370, the BB card 221 informs the monitor & controller 230 of completion of the blocking processing.

In Step S380, the monitor & controller 230 informs the operation system 260 of the state of the BB card 221.

Meanwhile, when a new call is set while performing the resource drive-out, a necessary processing is performed in the BB card 223 on the handed-over side. The call processing controller 240 (CP-CNT) receives the setting of the new call, and eventually determines whether to accept the new call in the BB card 223.

Further, when a cell change setting is performed from another cell during the resource drive-out, the cell change setting is performed in the BB card 223 on the handed-over side.

Further, in the case of the resource drive-out attributable to a fault of the BB card 221, the zero grant may not be transmitted from the BB card 221. In this case, the BB card 223 may transmit the zero grant to the mobile station 300 instead of the BB card 221.

(3.2.2) OPERATION EXAMPLE 2

In the operation example 1, when the resource is reallocated from the BB card 221 to the BB card 223, the BE card 223 transmits the floor grant by targeting only a process in which the BB card 221 is active. Further, at the time of completion of performing the resource drive-out on all the EUL users, the MAC-e scheduler is resumed.

That is, irrespective of the suspending and resuming of the MAC-e scheduler, the transmission of the uplink user data UD (baseband signal BS) is forcibly resumed. Therefore, until the MAC-e scheduler is resumed, the user data UD are temporarily transmitted and received in accordance with the floor grant (lowest transmission rate). However, when the resource drive-out processing, i.e., the handover processing from the BB card 221 to the BB card 223, takes a long time, the transmission and reception state of the user data UD which is in accordance with the floor grant becomes long, so that it takes time to have transmission rate return to its original rate before the time of the resource drive-out.

Thus, in the operation example 2, the BB card 223 starts the MAC-e scheduler before completion of the handover processing of various parameters. Therefore, the transmission rate of the user data UD (baseband signal BS) is controlled in accordance with the MAC-e scheduler without using the floor grant. Only parts different from those of the operation example 1 are mainly described below.

Processings in Steps S410 to S430 shown in FIG. 5 are the same as those of Steps S210 to S230 of the operation example 1.

In Step S440, the BB card 223 starts the MAC-e scheduler. In this operation example, the scope of the absolute grant represents all the H-ARQ processes irrespective of the length of TTI.

Processings in Steps S450 to S480 are the same as those of Steps S240 to S270 of the operation example 1. Further, processings in Steps S510 to S530 are the same as those of Steps S310, S320, and S330 of the operation example 1.

In this operation example, the zero grant is set to all the mobile stations 300, so that upon receiving scheduling information transmitted from the mobile station 300, the radio base station 200 allocates a scheduling grant (SG) again.

Processings in Steps S540 to S550 are the same as those of Steps S370 to S380 of the operation example 1.

(3.2.3) OPERATION EXAMPLE 3

In the above operation example 2, the zero grant is transmitted to each EUL user (mobile station 300). After the zero grant is transmitted to all the EUL users, the resource drive-out processing is performed for each EUL user.

Figure 6:
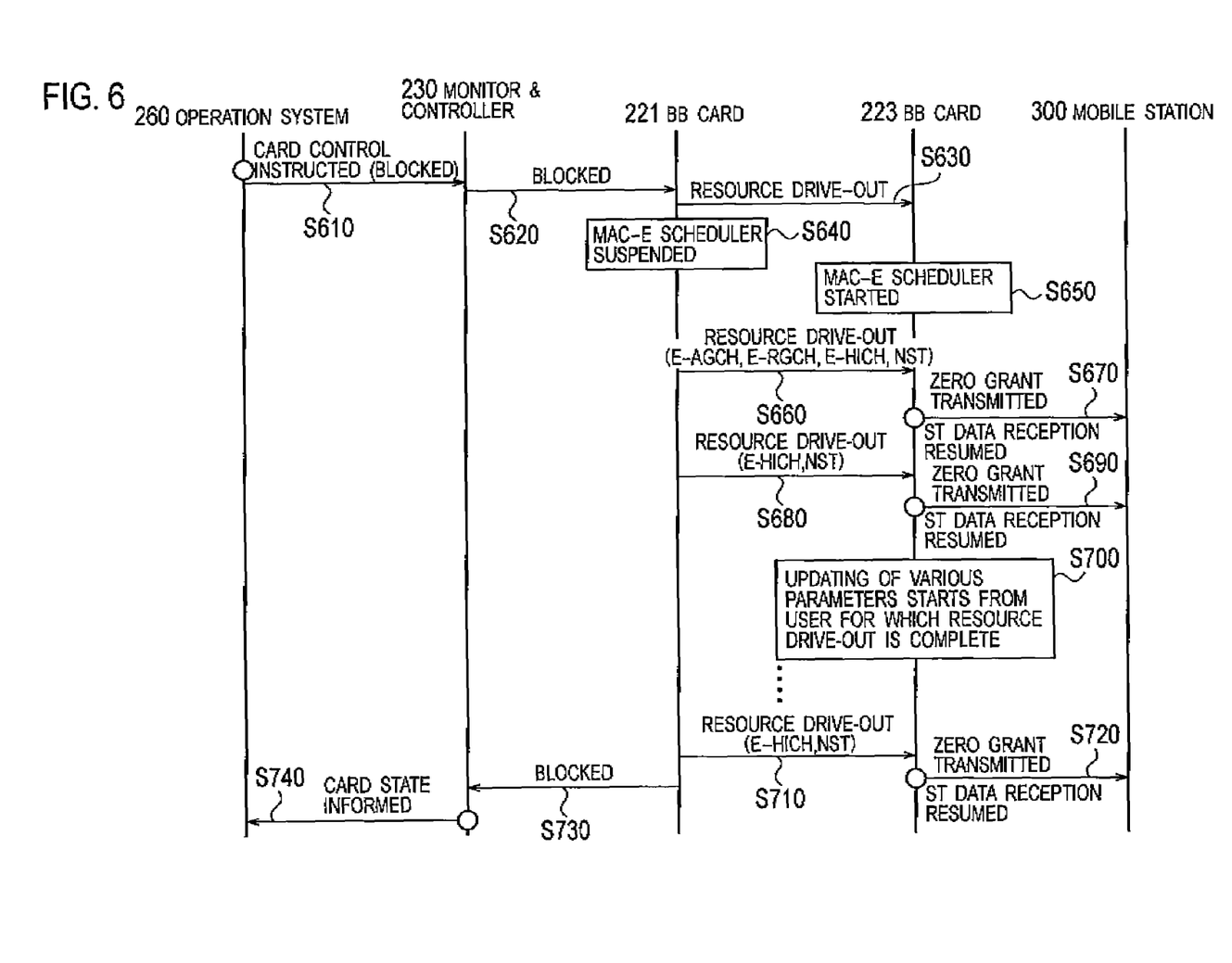
FIG. 6 is a communication sequence diagram (Operation 3) on the control of uplink user data UD in the case where switching to a baseband processor of a standby system according to an embodiment of the present invention is performed.

In the operation example 3, the radio base station 200 firstly performs the resource drive-out, and the zero grant is transmitted to EUL users in the order of completion of the resource drive-out. That is, in the BB card 221 (resource drive-out originator), until immediately before transmission of the zero grant, the transmission and reception of the user data UD is continued. Only parts different from those of the operation example 2 are mainly described below.

Processings in Steps S610 to S620 shown in FIG. 6 are the same as those of Steps S410 to S420 of the operation example 2.

In Step S630, the BB card 221 performs the resource drive-out of parameters of the user data UD regarding the EUL users, to the BB card 223. Further, instead of the resource drive-out to the BB card 223, the parameters may be set again by the call processing controller 240 to the BB card 223.

Processings in Steps S640 to S650 are the same as those of Steps S430 to S440 of the operation example 2.

Subsequently, in Step S660, the resource drive-out, to the BB card 223, of parameters of the user data UD regarding a corresponding EUL user is performed. In Step S660, targeting the E-AGCH, P-RGCH, E-HICH, and NST data, the BB card 221 performs the resource drive-out.

In Step S670, the BE card 223 transmits the zero grant to a mobile station 300 being an EUL user for whom the resource to drive-out is complete. After the resource drive-out is complete, the BB card 223 resumes reception of the user data UD (ST data).

In Step S680, the resource drive-out of parameters, to the BB card 223, of the user data UD regarding a corresponding US EUL user is performed. In Step S680, targeting the E-HICH, and NST data, the BB card 221 performs the resource drive-out.

In Step S690, as in Step S670, the BB card 223 transmits the zero grant to the mobile station 300. More specifically, the BB card 223 transmits the zero grant to a mobile station 300 being an EUL user for which the resource drive-out is complete in the processing of Step S680.

In Step S700, the BE card 223 updates various parameters of EUL users for whom the resource drive-out is complete in the order of completion of the resource drive-out.

In Steps S710 to S720, the transmission of the resource drive-out and the zero grant is repeated for each EUL user.

Processings in Steps S730 to S740 are the same as those of Steps S540 to S550 of the operation example 2.

(4) OPERATIONS AND EFFECTS

The radio base station 200, before switching from the BB card 221 to the BB card 223, a suspension request (CA rate=0 kbps, the zero grant) for suspending the transmission of the user data UD is transmitted to the mobile station 300 or to the RNC 100.

Accordingly, even when the switching between BB cards occurs, the user data UD is prevented from being lost using a control function for the transmission rate of the user data UD.

In this embodiment, when the switching to the BB card 223 is complete, the communication resuming request (CA rate=x kbps, the floor grant) indicating that the transmission rate of the user data UD is increased is transmitted. Therefore, when the switching to the BB card 223 is complete, the transmission of the user data UD can be forcibly resumed by the radio base station 200.

Further, at the time of resumption of the transmission of the user data UD, since the mobile station 300 transmits the user data UD at the floor grant, i.e., at the lowest transmission rate, the user data UD can be securely prevented from being missed thanks to the user data UD gradually transmitted even in the case where the MAC-e scheduler has not yet started (resumed).

In this embodiment, when the radio base station 200 receives the user data UD before completion of the resource drive-out, the user data UD are retained in the BB card 221, and when the radio base station 200 receives the user data UD after completion of the resource drive-out, the user data UD are retained in the BB card 223. Therefore, the user data UD can be securely prevented from being lost at the time of switching between the BB cards.

Further, based on an amount of the user data UD which the BB card 221 has received within a predetermined period of timer the baseband signal processor 220 starts performing the resource drive-out on a mobile station 300 (an HSDPA user or an EUL user) having a large amount of the user data UD. Therefore, the user data UD of a user who is very likely to lose the user data UD can be more securely prevented from being missed.

(5) OTHER EMBODIMENTS

As described above, the present invention has been set forth in the embodiment. But it should not be understood that the discussion and the drawings constituting a part of this disclosure are interpreted to limit the present invention. It is apparent to the skilled person that various alternatives, modifications, and the practices can be achieved based on this disclosure.

In the embodiment of the present invention, for example, when the radio base station 200 receives the user data UD before completion of the resource drive-out, the user data UD are retained in the BB card 221, and when the radio base station 200 receives the user data UD after completion of the resource drive-out, the user data UD are retained in the BB card 223. However, such a processing is not necessarily performed.

In the embodiment, the resource drive-out is started from the mobile station 300 having a large amount of the user data UD. However, such a processing is also not necessarily performed.

It should be understood that this invention may be embodied in other various forms that are not described herein. Accordingly, the present embodiments are to be considered in all respects as illustrative and not restrictive, the scope of the invention being indicated by the appended claims rather than by the foregoing description.

Note that the entire contents of the Japanese Patent Application No. 2008-003445, filed on Jan. 10, 2008, are incorporated herein by reference.

What is claimed is:

1. A radio base station comprising:
    a first baseband processor configured to perform a processing of a baseband signal including user data transmitted and received by a mobile station;
    a second baseband processor used as a standby system of the first baseband processor;
    a switching determiner configured to determine whether or not to switch from the first baseband processor to the second baseband processor;
    an information transmitter configured to transmit a suspension request to suspend the transmission of the user data prior to the switching from the first baseband processor to the second baseband processor, when the switching determiner determines the switching from the first baseband processor to the second baseband processor; and
    an handover execution unit configured to perform the handover of a processing from the first baseband processor to the second baseband processor, based on the transmission of the suspension request by the information transmitter, or on the determination of the transmission of the suspension request, wherein
    the information transmitter transmits the suspension request to set the transmission rate of the user data to zero, the radio base station operates in accordance with HSDPA defined by the 3rd generation partnership project and in accordance with EUL defined by the 3rd generation partnership project, the information transmitter transmits a notification indicating that a capacity allocation rate is 0 kbps to radio network controller as the suspension request, when the radio base station operates in accordance with the HSDPA, or transmits a zero grant to the mobile station as the suspension request, when the radio base station operates in accordance with the EUL.

2. The radio base station according to claim 1, wherein when the handover execution unit completes the handover of the processing from the first baseband processor to the second baseband processor, the information transmitter transmits a communication resuming request to increase the transmission rate.

3. The radio base station according to claim 2, wherein the information transmitter transmits the communication resuming request to increase the transmission rate to a settable lowest transmission rate.

4. The radio base station according to claim 1, wherein the handover execution unit:

performs an handover processing in which a parameter of the user data set in the first baseband processor is handed over to the second baseband processor;

retains the user data in the first baseband processor when receiving the user data before completion of the handover processing; and retains the user data in the second baseband processor when receiving the user data after completion of the handover processing.

5. The radio base station according to claim 1, wherein the first baseband processor relays the user data corresponding to each one of a plurality of mobile stations, the handover execution unit performs an handover processing in which a parameter of the user data set in the first baseband processor is handed over to the second baseband processor, and based on an amount of the user data received by the first baseband processor within a predetermined period of time, the handover execution unit starts performing the handover processing for the mobile stations in descending order of the amount of the user data.

6. A radio communication control method which uses a radio base station having a first baseband processor performing a processing of a baseband signal including user data transmitted and received by a mobile station, and a second baseband processor used as a standby system of the first baseband processor, the radio communication control method comprising the steps of:

determining whether or not to switch from the first baseband processor to the second baseband processor;

transmitting a suspension request to suspend the transmission of the user data prior to the switching from the first baseband processor to the second baseband processor when the switching determiner determines the switching from the first baseband processor to the second baseband processor; and performing the handover of a processing from the first baseband processor to the second baseband processor, based on the transmission of the suspension request by the information transmitter, or on the determination of the transmission of the suspension request, wherein the suspension request to set the transmission rate of the user data to zero is transmitted in the transmitting step, the radio base station operates in accordance with HSDPA defined by the 3rd generation partnership project and in accordance with EUL defined by the 3rd generation partnership project, in the transmitting step, transmitting a notification indicating that a capacity allocation rate is 0 kbps to a radio network controller as the suspension request, when the radio base station operates in accordance with the HSDPA, or transmitting a zero grant to the mobile station as the suspension request, when the radio base station operates in accordance with the EUL.

* * * * *